F. SCHILKE.
AUTO TIRE COVER.
APPLICATION FILED APR. 22, 1918.
1,292,088.
Patented Jan. 21, 1919.
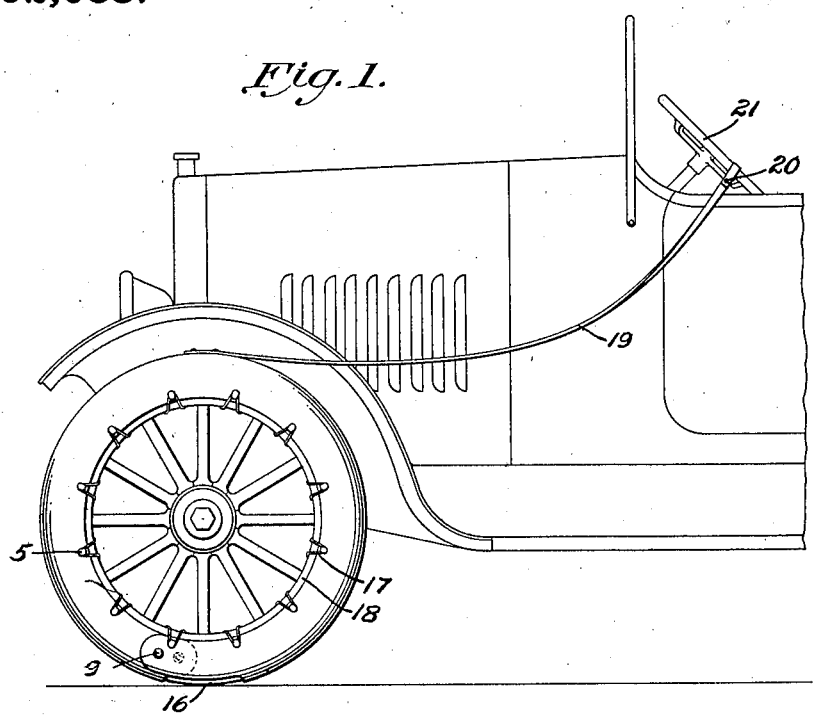
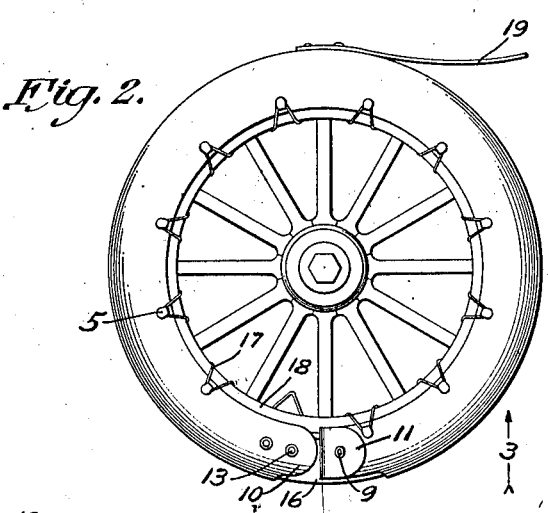
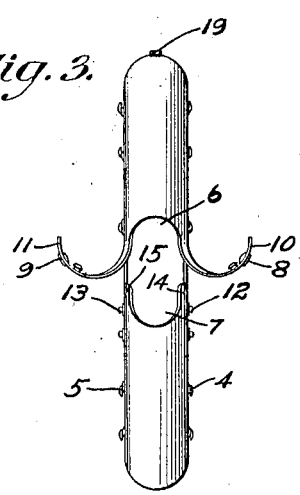
Inventor
FRED SCHILKE
BY
Hazard & Miller
ATT'YS.

ent text.

UNITED STATES PATENT OFFICE.

FRED SCHILKE, OF OATMAN, ARIZONA.

AUTO-TIRE COVER.

1,292,088.   Specification of Letters Patent.   Patented Jan. 21, 1919.

Application filed April 22, 1918. Serial No. 230,062.

*To all whom it may concern:*

Be it known that I, FRED SCHILKE, a citizen of the United States, residing at Oatman, in the county of Mohave and State of Arizona, have invented new and useful Improvements in Auto-Tire Covers, of which the following is a specification.

My invention relates to auto tire covers and consists of the novel features herein shown, described and claimed.

My object is to make a tire cover which may be readily applied to and removed from a wheel upon an automobile standing upon the ground, so that an operator may protect the tires of his automobile, as when standing in the sun.

Figure 1 is a side elevation showing an auto tire cover embodying the principles of my invention in position for use upon the front wheel of an automobile, the rear part of the automobile being broken away.

Fig. 2 is a side elevation of the wheel and tire cover shown in Fig. 1 and illustrating the operation of applying or removing the cover from the wheel.

Fig. 3 is a bottom plan view as seen looking in the direction indicated by the arrow 3 in Fig. 2.

Fig. 4 is a fragmentary plan of the cover from the outside and showing the cover flattened out.

The body 1 of the cover is formed of any suitable fabric such as duck, canvas, or similar material, and has straight parallel side edges 2 and 3. Lace hooks 4 and 5 are secured against the outer face along the edges 2 and 3. The body 1 is cut away at the ends to form the clearances 6 and 7, and snap fastener members 8 and 9 are applied to the tongues 10 and 11 on opposite sides of the clearance 6 to engage the snap fastener members 12 and 13 on the tongues 14 and 15 on opposite sides of the clearance 7. The cover 6 thus constructed is placed in position with the bottom of the clearance 7 striking the ground at one side of the wheel tire 16 where the tire rests upon the ground, and the cover is wrapped around the tire passing up, over, and downwardly until the bottom of the clearance 6 engages the ground at the other side of the spot upon which the tire rests. The snap fasteners are brought together to secure the tongues 10 and 11 to the tongues 14 and 15, and the lace 17 is applied to the hooks 4 and 5 back and forth inside of the felly 18. A strap or tape 19 is secured to the cover body 1 and has a snap 20 upon its other end to engage the steering wheel 21 so as to remind the driver of the automobile to remove the cover before starting the power.

The cover thus constructed is principally intended to protect the rubber casings from the hot sun while the automobile is standing unused, and the cover may be more or less waterproof to protect the tire from rain. The leading feature of my invention over an ordinary tire cover is the provision of clearances 6 and 7 so that the cover may be applied to and removed from the tire while the wheel is standing still upon the ground and without rotating the wheel, and the provision of the strap or tape 19 and snap 20 secured to the cover and adapted to be connected to the steering wheel to remind the operator of the automobile to remove the cover before starting the automobile.

Various changes may be made in the details of construction without departing from the spirit of my invention as claimed.

I claim:

1. An auto tire cover comprising a body of flexible material adapted to encircle and cover a tire upon a wheel standing upon the ground; said cover having a clearance cut away from its ends to avoid the spot of the tire resting upon the ground, there being overlapping tongues extending past the sides of the clearance; snap fastening members upon the tongues for connecting the tongues together, lace hooks secured against the outer face of the material along the edges, and a lace adapted to be applied to the lace hooks back and forth along the inside of the felly.

2. As an article of manufacture, an auto tire cover adapted to be applied to and removed from a tire upon a wheel standing still upon the ground; said auto tire cover comprising a body of flexible material adapted to encircle and cover the tire and having a clearance cut away from its ends to avoid the spot of the tire resting upon the ground and having tongues extending past the clearance and means for connecting the tongues together.

I hereby declare the described improvement to be new and my own.

FRED SCHILKE.

Witnesses:
EMANUEL L. REED,
MAY C. EDMUNDS.

Copies of this patent may be obtained for five cents each, by addressing the "Commissioner of Patents, Washington, D. C."